United States Patent [19]
Mathewson

[11] Patent Number: 5,122,887
[45] Date of Patent: Jun. 16, 1992

[54] COLOR DISPLAY UTILIZING TWISTED NEMATIC LCDS AND SELECTIVE POLARIZERS

[75] Inventor: Christopher W. Mathewson, Rochester, N.Y.

[73] Assignee: Sayett Group, Inc., Rochester, N.Y.

[21] Appl. No.: 664,890

[22] Filed: Mar. 5, 1991

[51] Int. Cl.⁵ .............................................. G02F 1/133
[52] U.S. Cl. ........................................ 359/53; 359/64
[58] Field of Search ................................ 350/335, 337

[56] References Cited

U.S. PATENT DOCUMENTS

| | | | |
|---|---|---|---|
| 4,416,514 | 11/1983 | Plummer | 350/335 |
| 4,758,818 | 7/1988 | Vatne | 350/335 |
| 4,838,655 | 6/1989 | Hunahata et al. | 350/339 F |
| 4,867,536 | 9/1989 | Pidsosny et al. | 350/335 |
| 4,917,464 | 4/1990 | Conner | 350/335 |
| 4,917,465 | 4/1990 | Conner et al. | 350/335 |
| 5,032,007 | 7/1991 | Silverstein | 350/335 |
| 5,050,965 | 9/1991 | Conner et al. | 359/93 |

Primary Examiner—Stanley D. Miller
Assistant Examiner—Anita Pellman Gross
Attorney, Agent, or Firm—Cumpston & Shaw

[57] ABSTRACT

A full color liquid crystal display comprises first, second, and third subtractive LCD filters, each filter comprising means for independently subtracting one of the primary subtractive colors from a polychromatic light beam, without substantially affecting the other subtractive colors. Each of the subtractive LCD filters combines wavelength selective dichroic polarizers with a twisted nematic liquid crystal cell to provide a filter that can selectively subtract varying amounts of incident spectral radiant energy from within one of three primary energy bands. A first selective polarizer that linearly polarizes wavelengths in the appropriate one of the above mentioned color bands, while passing light in the other two bands substantially unaffected, a first liquid crystal cell, and a second selective dichroic polarizer identical to the first polarizer, but positioned wih its axis of polarization perpendicular to that of the first polarizer. This filter will pass light of all colors when non-selected, but will block or subtract light of the particular color when in the selected state.

16 Claims, 19 Drawing Sheets

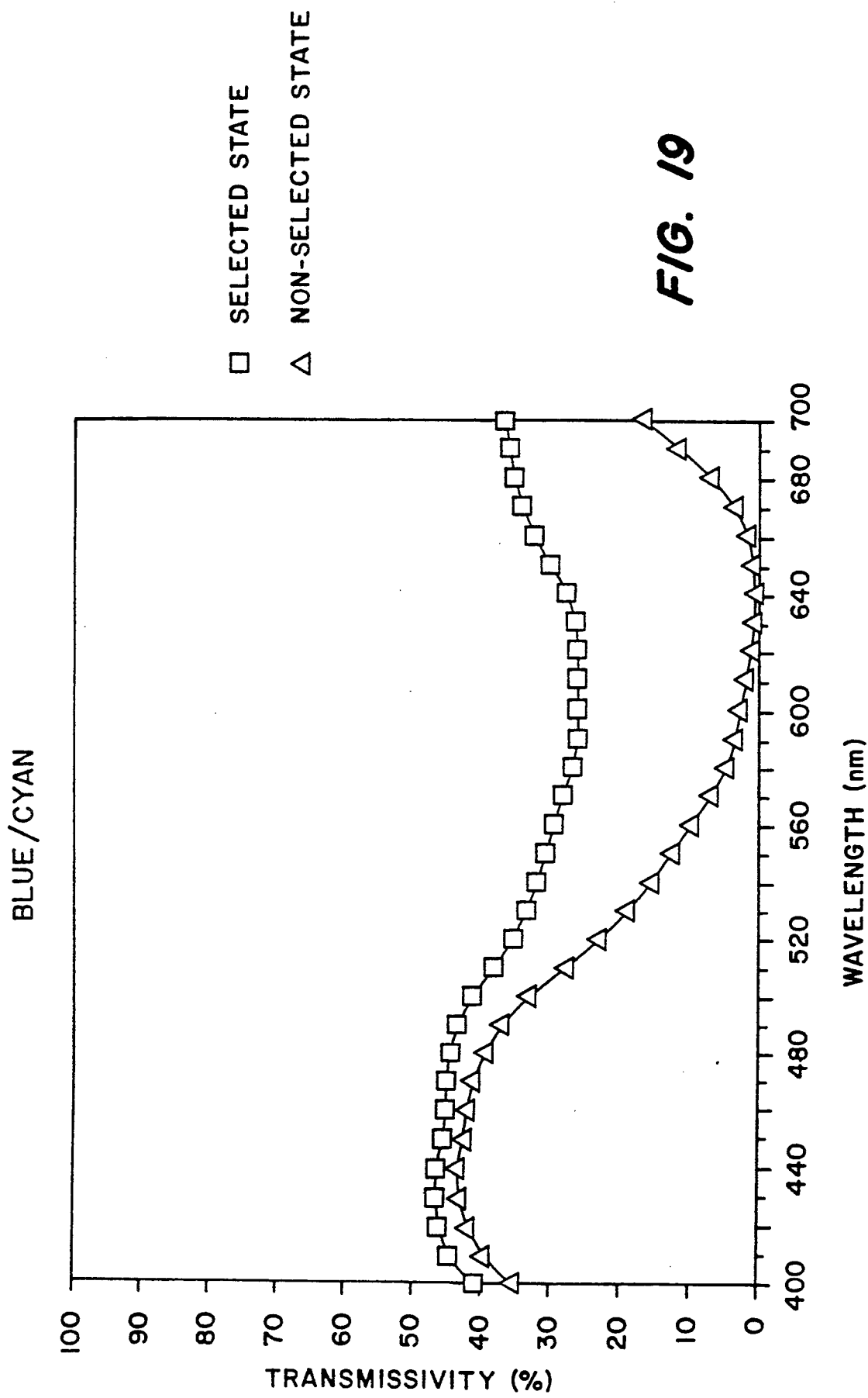

COLOR DISPLAY UTILIZING TWISTED NEMATIC LCDS AND SELECTIVE POLARIZERS

This invention relates in general to liquid crystal displays and more particularly to a display that includes first, second and third subtractive primary color cells, and is easily adapted to display the color output of a computer or the like.

Liquid crystal display systems provide a number of advantages over cathode ray tubes for computer displays, particularly displays for portable computers or other applications where low power consumption and small size are critical.

Color displays incorporating liquid crystal elements are known, for example, from U.S. Pat. Nos. 4,025,164, 4,416,514 and 4,917,465.

Doriguzzi et al U.S. Pat. No. 4,025,164 shows a liquid crystal display device for a colored display that includes a reflector, a twisted nematic liquid crystal cell, a selective polarizer in front of the cell, and a linear polarizer between the cell and the reflector. The display is said to produce outstandingly brilliant colors, but is not adapted to produce a full color display, that is, a display including a substantially full range of colors.

Plummer U.S. Pat. No. 4,416,514 will produce a full color display. The filter comprises a plurality of colored dye polarizing elements, each associated with a voltage responsive twisted nematic liquid crystal cell, and a plane polarizer. The three dye polarizers are preferably magenta, cyan and yellow polarizers, and are oriented optically parallel to the transmission axis of the plane polarizer. By appropriately energizing the liquid crystal cells, a spectrum of colors can be obtained. However, there is not a simple relationship among the energized cells and the colors produced. For example, the first cell controls the green transmission, the second cell controls the red and the blue transmission, and the blue transmission is also controlled by the third cell.

Connor et al U.S. Pat. No. 4,917,465 employs super twisted nematic birefringent LCD panels in a color display. Using the birefringent operating mode of certain liquid crystal materials, colors can be produced without relying on colored dyes in the guest-host type cells or on rotation of light through known twist angles in twisted nematic cells. Birefringence is the dependency on wavelength of the polarization change imparted to light as it passes through a liquid crystal panel.

The present invention provides, in a structurally and conceptually simple arrangement, a liquid crystal display system that combines wavelength selective dichroic polarizers with twisted nematic liquid crystal cells to produce a system that can be combined with a light source to selectively subtract from the light produced by the source, varying amounts of incident radiant energy from the three primary energy bands of the spectrum, namely red, green and blue light. The subtraction is directly mapped on the liquid crystal cells. That is, red light is subtracted by applying an appropriate signal to the red cell, green light is subtracted by applying an appropriate signal to the green cell, and blue is subtracted by applying an appropriate signal to the blue cell. Signals are applied to combinations of cells only if it is necessary to subtract colors that are combinations of red, green and blue. Overall the mapping is substantially simpler than has been the case in the prior art. This is particularly useful in displays that are interfaced to computers that provide RGB output signals, because the signals can be used to drive the display with simple interface means.

In the display system of the present invention, each of the three LCD cells and its associated polarizers uniquely controls one of the three bands of spectrum energy independently. The present system produces a more complete spectrum of colors, limited only by the ability to produce polarizers and LCDs with appropriate characteristics for each color. It is not further limited by an interdependence between LCD channels. In addition, any reliance on birefringent characteristics of the liquid crystal cells is eliminated.

Briefly stated, and in accordance with the present preferred aspect of this invention, a full color liquid crystal display comprises first, second, and third subtractive LCD filters, each filter comprising means for independently subtracting one of the primary subtractive colors from a polychromatic light beam, without substantially affecting the other subtractive colors. Each of the subtractive LCD filters combines wavelength selective dichroic polarizers with a twisted nematic liquid crystal cell to provide a filter that can selectively subtract varying amounts of incident spectral radiant energy from within one of three primary energy bands, which are approximately the red band extending from 580-680 nm, and the green band extending from 480-580 nm, and the blue band extending from 380-480 nm.

In a particularly advantageous embodiment of the invention, each filter comprises, for its particular primary subtractive color, a first selective polarizer that linearly polarizes wavelengths in the appropriate one of the above mentioned color bands, while passing light in the other two bands substantially unaffected, a first liquid crystal cell, and a second selective dichroic polarizer identical to the first polarizer, but positioned with its axis of polarization perpendicular to that of the first polarizer. This filter will pass light of all colors when non-selected, but will block or subtract light of the particular color when in the selected state.

In accordance with an especially preferred embodiment of this invention, the three filters are arranged sequentially. The adjacent dichroic polarizers, between the first and second LCD panels, and between the second and third LCD panels are physically combined into single polarizers having the desired composite characteristics of the two polarizers that they replace. For example, if the subtractive LCD filters are arranged in the order yellow, magenta, cyan, the two composite selective dichroic polarizers will be the yellow and magenta polarizers, disposed between the yellow and magenta LCD panels, and the magenta and cyan polarizers disposed sequentially between the magenta and cyan LCD panels. The subtractive yellow and magenta filters are replaced by a single red dichroic polarizer, while the magenta and cyan filters are replaced by a blue selected dichroic polarizer. Thus, the full color LCD display would include a yellow polarizer, a first LCD panel, a red polarizer, a second LCD panel, a blue polarizer, a third selective LCD panel, and finally a cyan polarizer. Each of the first, second, and third LCD panels would uniquely and independently control one of the subtractive primary colors, namely, red, green and blue, in the example just given.

By rearranging the order of the subtractive primary color filters, different additive primary color selective dichroic polarizers can be used. The order may be arranged to make best use of polarizers that are available, or that are the most effective.

While the aspects of this invention that are considered novel are set forth with particularity in the appended claims, the invention itself, together with further objects and advantages thereof may be more readily comprehended by reference to the following detailed description of a presently preferred embodiment of the invention, taken in conjunction with the accompanying drawings in which:

FIG. 19 is a graph of the transmissivity of an LCD filter as in FIG. 16, as realized using actual components.

Figure 1:
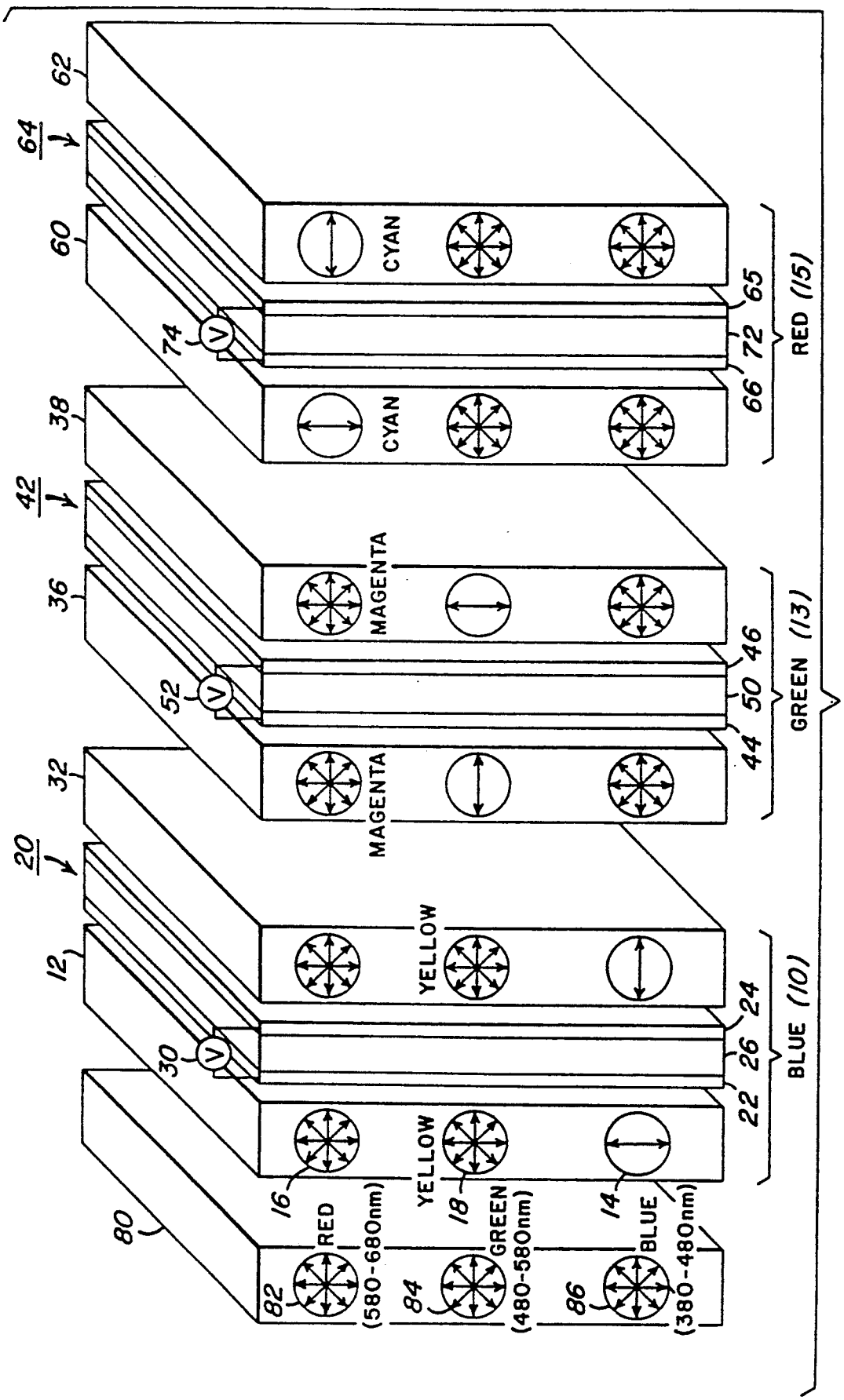
FIG. 1 is a diagrammatic view of a full color liquid crystal display in accordance with this invention.

A full color liquid crystal display in accordance with this invention is illustrated diagrammatically in FIG. 1. The display includes first, second, and third subtractive LCD filters 10, 13, 15 respectively. Each of the filters is made up of an input selective dichroic polarizer, an LCD panel, and an output selective dichroic polarizer. Referring first to filter 10, an input polarizer 12 is provided for selectively polarizing blue light. The polarization direction of the input polarizer is vertical, as indicated by arrow 14. The polarizer 12 does not affect the polarization of red or green light. This is indicated by the multi-headed arrows 16 and 18 respectively. A first liquid crystal display panel 20 includes transparent electrodes 22 and 24 forming a sandwich around layer of liquid crystal material 26. The liquid crystal layer 26 is selectively energized by an electric field created between electrodes 24 and 26 by the application of a voltage from a voltage source 30. Liquid crystal display panel 20 is preferably a twisted nematic (TN) liquid crystal cell adapted to twist the polarity of an incident wave 90° when in a non-selected state, and to apply substantially no twist when an appropriate electric field is applied across the cell in a selected state. An output selective dichroic polarizer 32 has substantially the same characteristics as input polarizer 12, but the polarization direction is oriented at 90° with respect thereto. For convenience, the filter 10 is referred to as the blue filter, because it selectively subtracts blue light from the incident beam. However, the selective dichroic polarizers are each referred to as yellow because they appear to be yellow when light is viewed through them.

The green filter 13 is substantially identical to the blue filter except for the characteristics of the polarizers. The green filter 13 includes input and output polarizers 36 and 38, and a liquid crystal display panel 42 that includes transparent electrodes 44 and 46, and a layer of liquid crystal material 50. A voltage source 52 controls the orientation of the liquid crystal material, by establishing a field between electrodes 44 and 46, and controls the change in polarization of light passing through the cell.

Finally, red filter 15 includes cyan input polarizer 60, orthogonally oriented cyan output polarizer 62, and liquid crystal display panel 64 including electrodes 66 and 68, for controlling a layer of liquid crystal material 72 by application of a voltage from a voltage source 74.

Typically, the full color liquid crystal display is used in conjunction with a source of polychromatic or white light 80, which may be an overhead projector or a back light panel for a portable computer display, or the equivalent. For purposes of illustrating the operation of this invention, the red, green, and blue components of the light emitted by source 80 is shown as three circles, in which the polarization of the light is indicated by arrows. The polarization in each of the red, green, and blue bands is shown in FIG. 1, and, as emitted by the panel, the light is unpolarized as is indicated by the multi-headed arrows 82, 84, and 86. Similar symbols but with slightly different meanings are used to show the effect of the selective dichroic polarizers 12, 32, 36, 38, 60, 62 on the light of each color. The multi-headed arrows show that the relevant filter has substantially no effect for light in that range. The two headed arrows show the direction of polarization in the range where the polarizers are effective.

Figure 2:
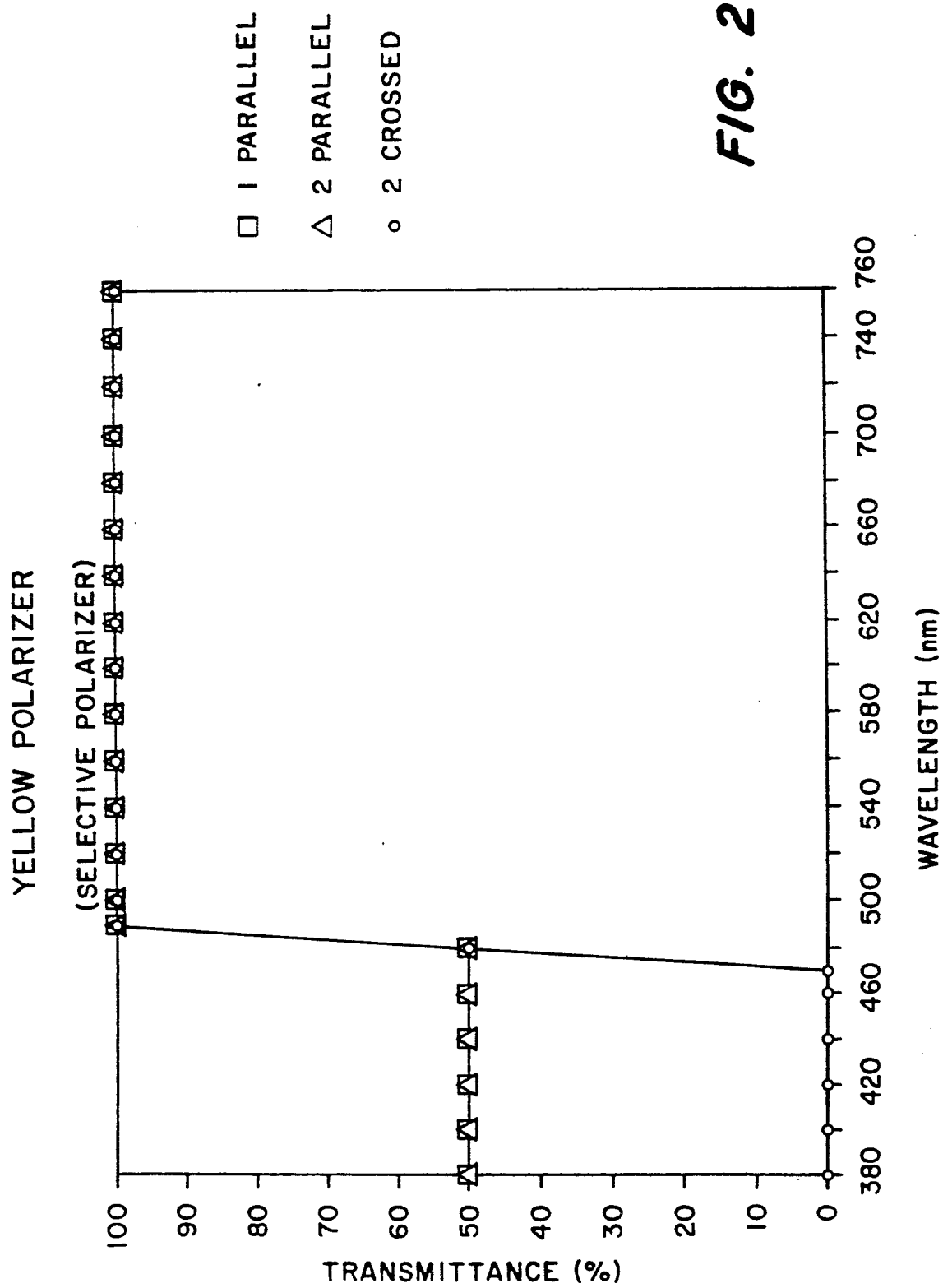
FIG. 2 is graph of the relative transmittance of an ideal yellow selective dichroic polarizer as used in this invention for parallel and cross-polarized incident light.

The operation of the liquid crystal display of this invention may be more fully understood by considering the characteristics of the individual elements that make up each of the filters. FIG. 2 shows in graphical form the transmittance characteristics of an ideal yellow polarizer. The transmittance characteristics are shown as a function of wavelength (color) for incident radiation polarized parallel and perpendicular to the polarization direction of the filter. For wavelengths above about 490 nm, the relative transmittance is 100% regardless of polarization. For wavelengths below 490 nm, the relative transmittance is about 50% for parallel polarization, and approximately 0% for cross-polarized incident light beams.

Figure 3:
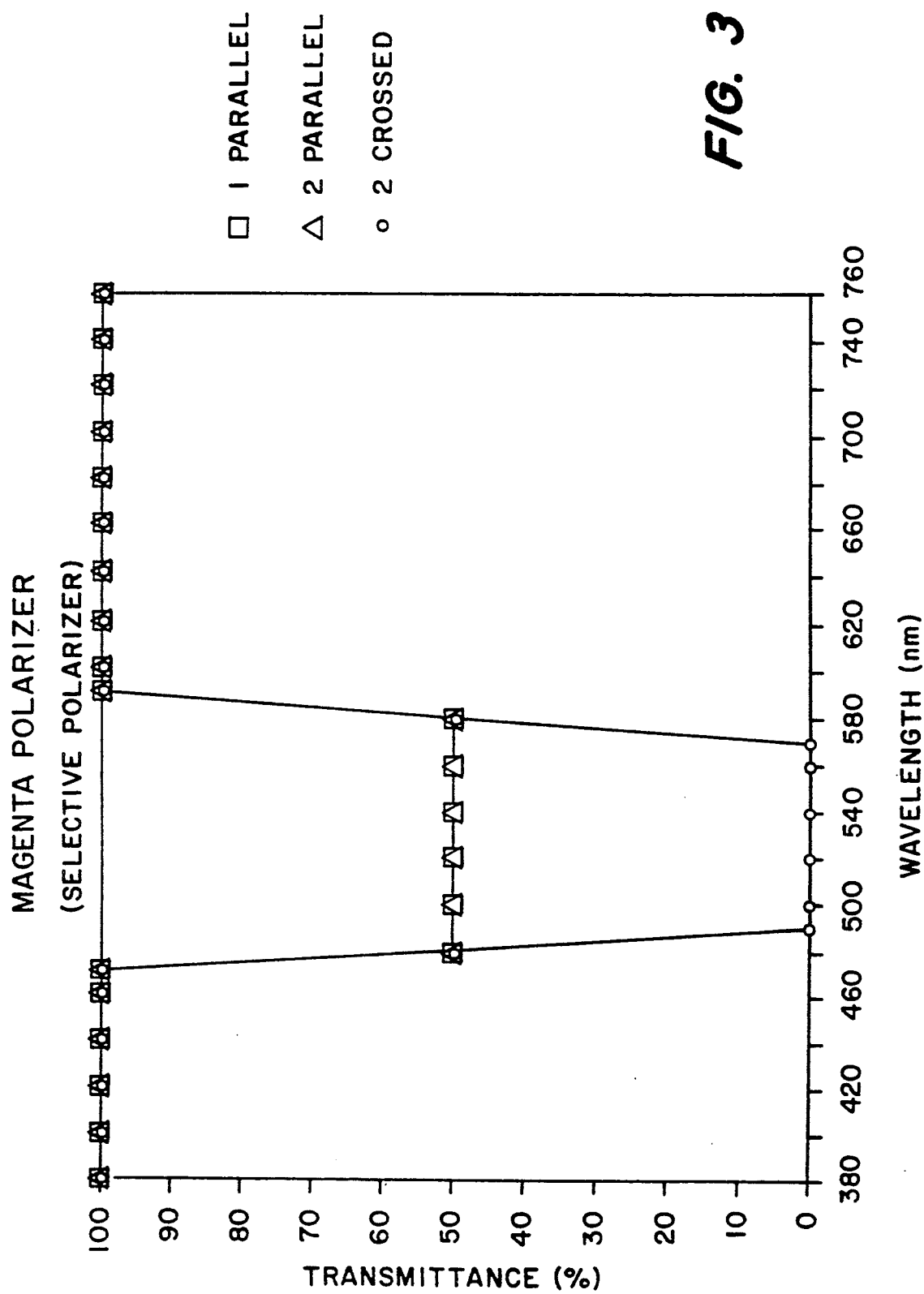
FIG. 3 is graph of the relative transmittance of an ideal magenta polarizer as used in this invention for parallel and cross-polarized incident light.

FIG. 3 shows in similar form the characteristics of ideal magenta polarizers 36, 38. Below about 470 nm and above 590 nm, the polarizer has a relative transmittance of about 100% without regard to polarization. Between 470 and 590 nm, the relative transmittance is about 50% for parallel polarization, and substantially 0% for cross-polarized instant light.

Figure 4:
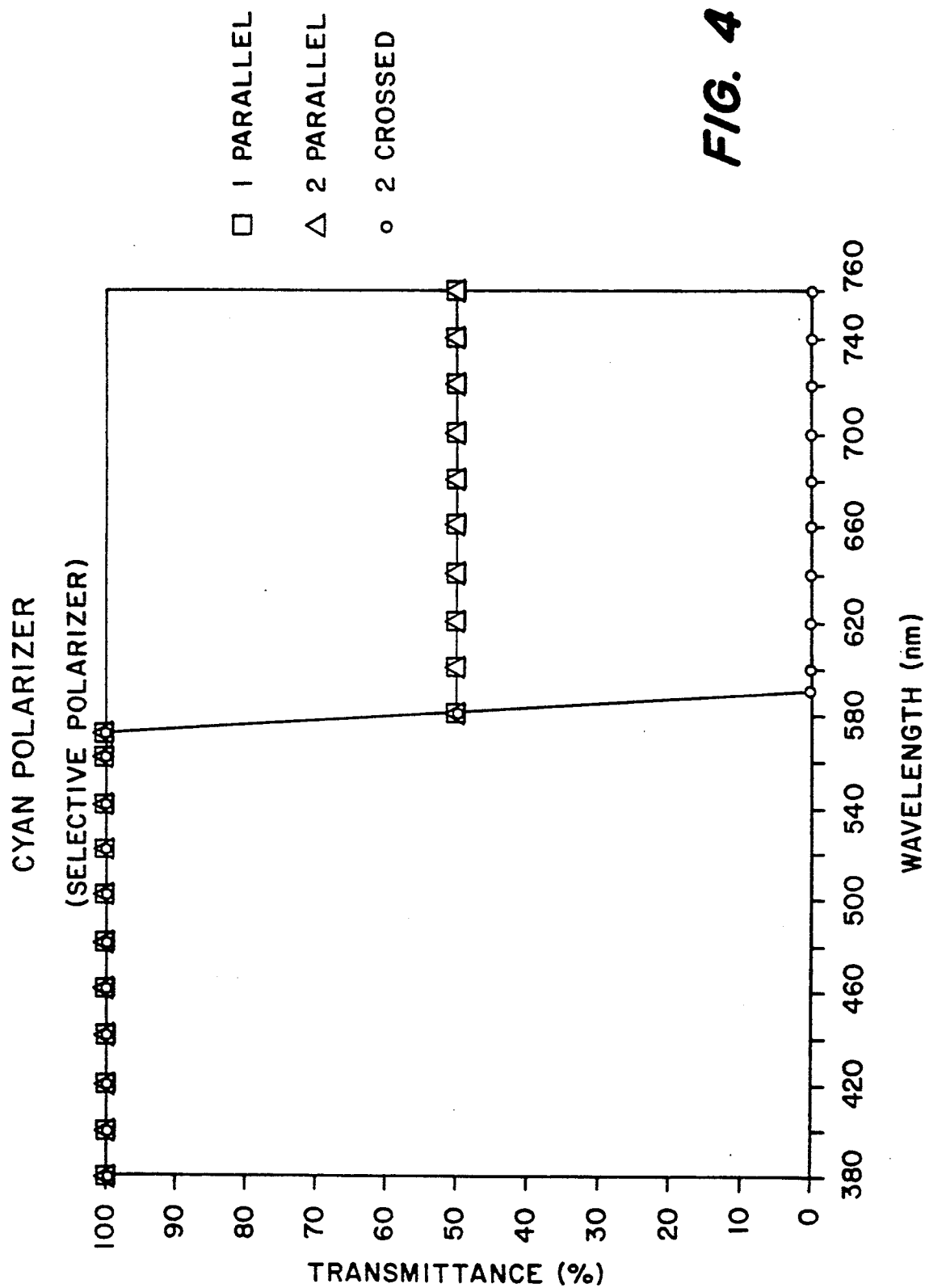
FIG. 4 is graph of the relative transmittance of an ideal cyan polarizer as used in this invention for parallel and cross-polarized incident light.

The characteristics of ideal cyan polarizers 60 and 62 are shown in FIG. 4. Below about 570 nm the relative transmittance is about 100% without regard to polarization. Above about 580 nm, the relative transmittance is 50% for parallel polarization, and substantially 0 for cross-polarized incident radiation.

Figure 5:
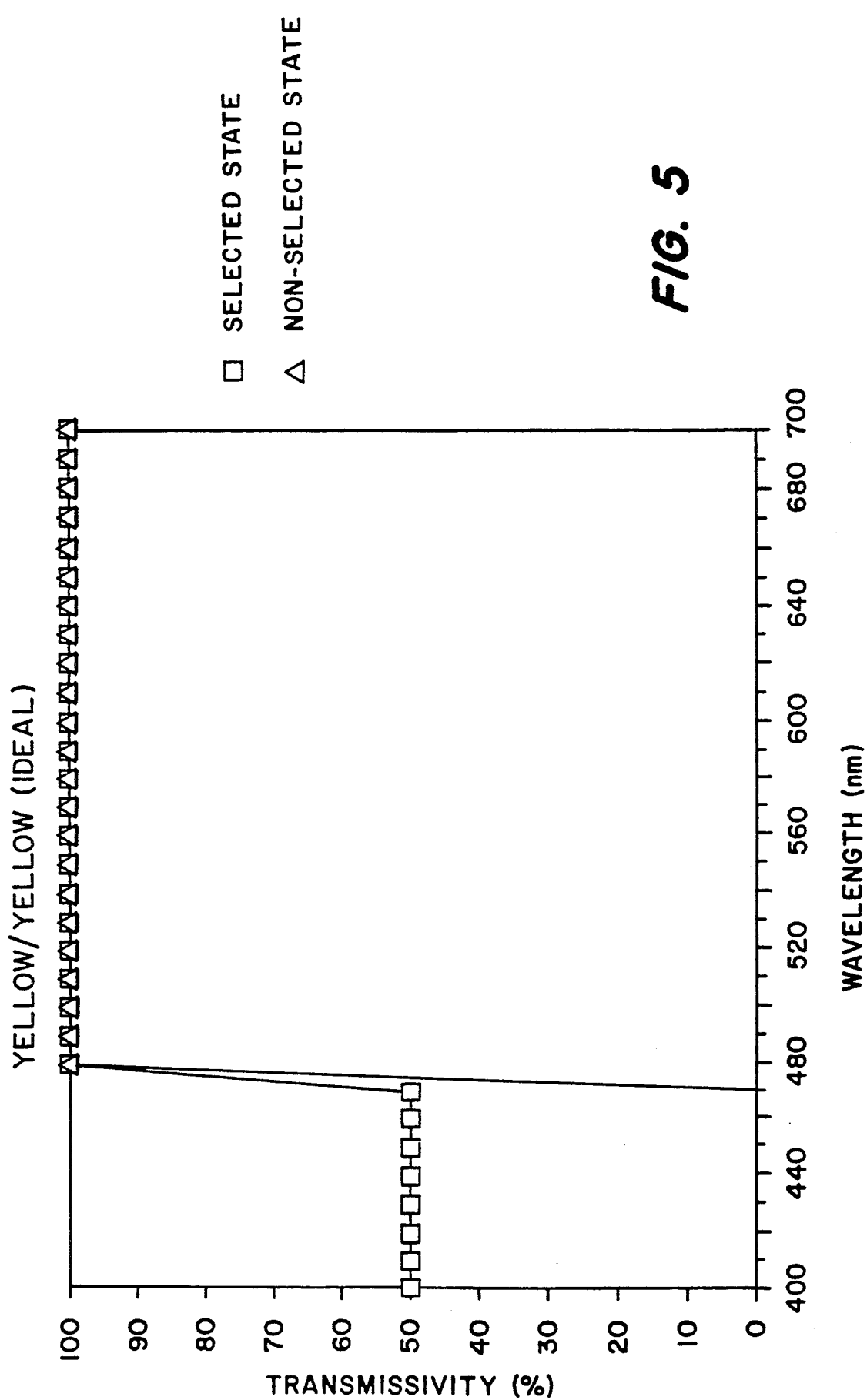
FIG. 5 is a graph of the relative transmissivity of a selective yellow filter in accordance with this invention, showing the transmissivity as a function of wavelength in selected and non-selected states.
Figure 6:
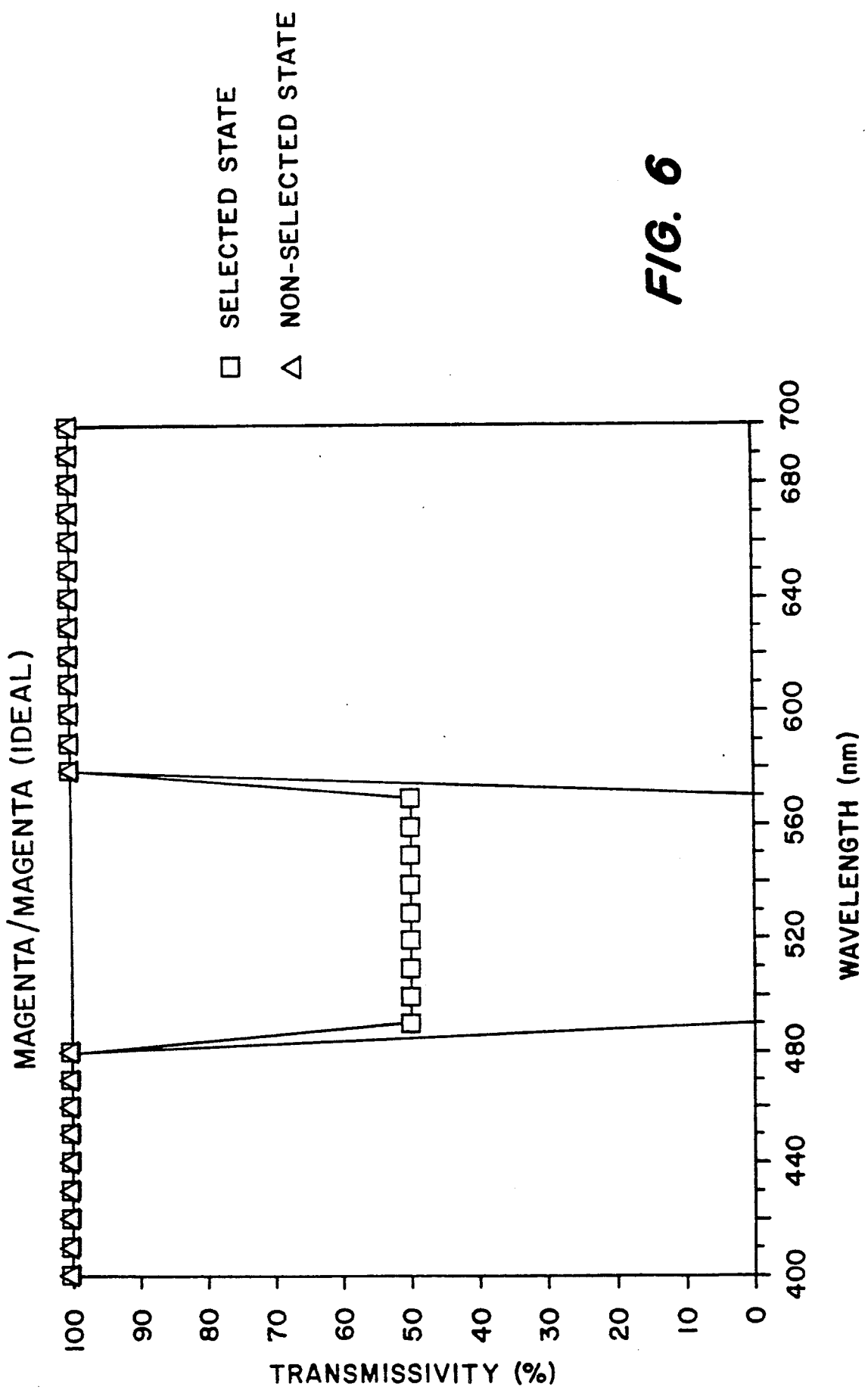
FIG. 6 is a graph of the relative transmissivity of a selective magenta filter in accordance with this invention, showing the transmissivity as a function of wavelength in selected and non-selected states.
Figure 7:
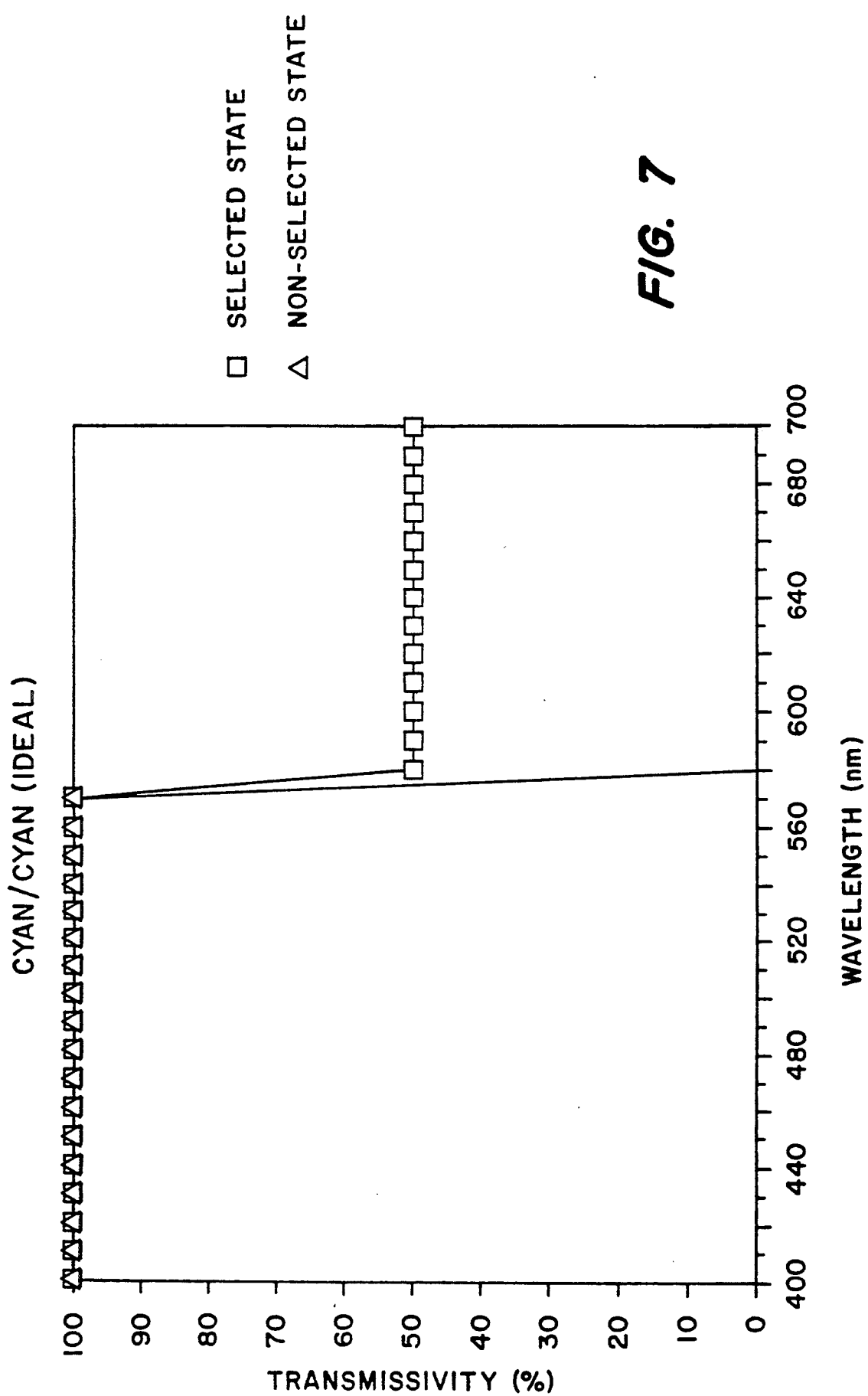
FIG. 7 is a graph of the relative transmissivity of a selective cyan filter in accordance with this invention, showing the transmissivity as a function of wavelength in selected and non-selected states.

The relative transmissivity of the yellow, magenta, and cyan filter sections, shown in FIG. 1, that is the three combinations of two selective dichroic polarizers and the intermediate LCD panel, are shown graphically in FIGS. 5, 6, and 7. The transmissivity is affected by the characteristics of the polarizers, their orientation, and the state of the liquid crystal panel in each section. As mentioned above, twisted nematic liquid crystal panels of the type employed in a preferred embodiment of this invention rotate the polarization of incident light through 90° in the unenergized state, and impart substantially no rotation in the energized state. Super twisted nematic liquid crystal material rotates the polarization of incident light through an angle of $90° + n(180°)$, where n is an integer that depends upon the effective twist, which in turn depends upon the amount of signal applied to the electrodes of the liquid crystal display panel. As is conventional, the state in which polarization rotation occurs is designated the non-selected, state, and the state in which no rotation occurs is designated the selected state. FIG. 5 shows that in both states, wavelengths above about 470 nm pass through the blue filter at a relative transmissivity of about 100%. Wavelengths below 480 nm are attenuated approximately 50% in the selected state, and are attenuated 100% in the non-selected state.

As shown in FIG. 6, the situation is similar for the green filter, except that the wavelengths affected are those in the range from about 480–580 nm. Above and below these limits, the light passes substantially unaffected regardless of state. Within this range, the transmissivity is about 50% in the selected state, and about 0% in the non-selected state.

Finally, the characteristics of the red filter are shown in FIG. 7. Wavelengths below about 570 nm are substantially unaffected by state. The wavelengths above 580 nm are attenuated about 50% in the selected state, and are attenuated about 100% in the non-selected state.

It will be appreciated that when the three filters are combined, there will be about a 50% attenuation of all of the light of all colors. Taking this as the new 100% relative transmissivity, each of the filters affects the light in its band of wavelengths, by switching from 100% relative transmissivity in the selected state to 0% relative transmissivity in the non-selected state. Each of the filters affects only the light in its band of wavelengths, as it is switched between the selected and non-selected states.

Because the red, green, and blue filters operate in a substantially independent manner, they may be arranged in any arbitrary order. However, by selecting the order in which the filters are positioned, the two adjacent dichroic polarizers between the LCD panels may be combined into one polarizer, to both reduce the number of components and enhance the overall transmissivity of the system.

There are three possible combinations, namely, yellow+magenta, yellow+cyan, and magenta+cyan. Yellow+magenta may be replaced by a red polarizer, yellow+cyan may be replaced by a green polarizer, and magenta+cyan may be replaced by a blue polarizer.

Figure 8:
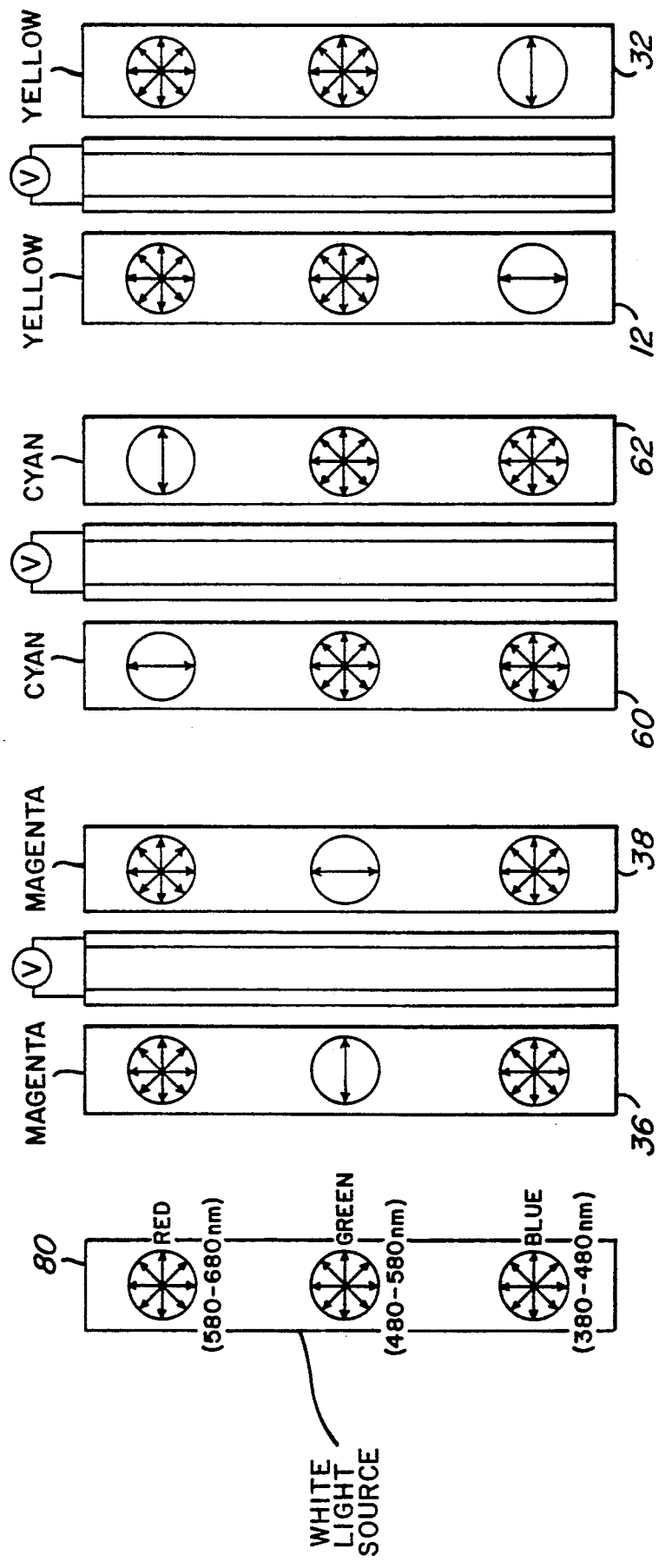
FIG. 8 shows a full color display in accordance with this invention with the subtractive primary color filters arranged in a different order from FIG. 1.
Figure 9:
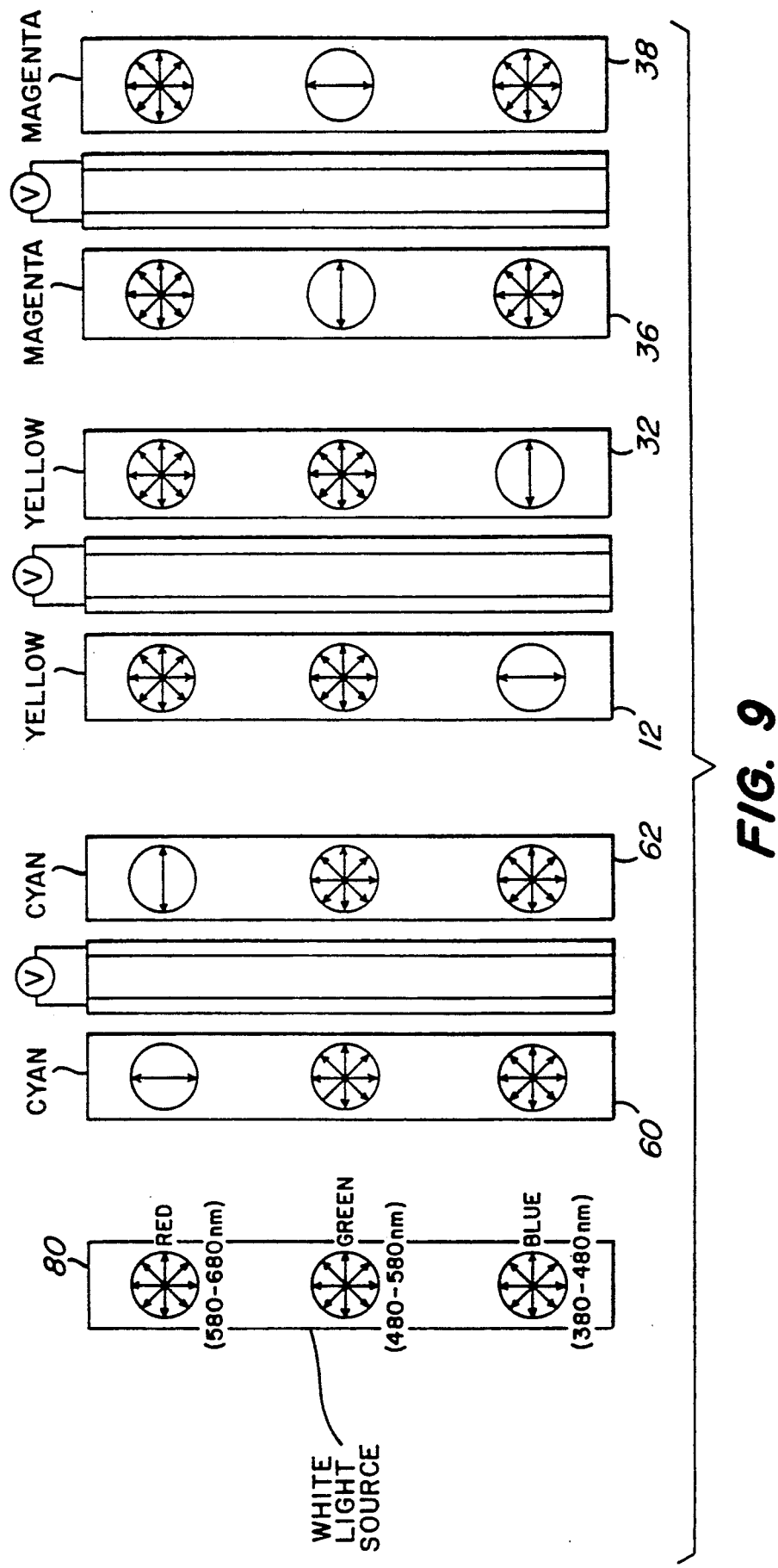
FIG. 9 shows yet another order.

FIGS. 8 and 9 show two of the several possible orderings of the filters, namely magenta-cyan-yellow, and cyan-yellow-magenta respectively.

Figure 10:
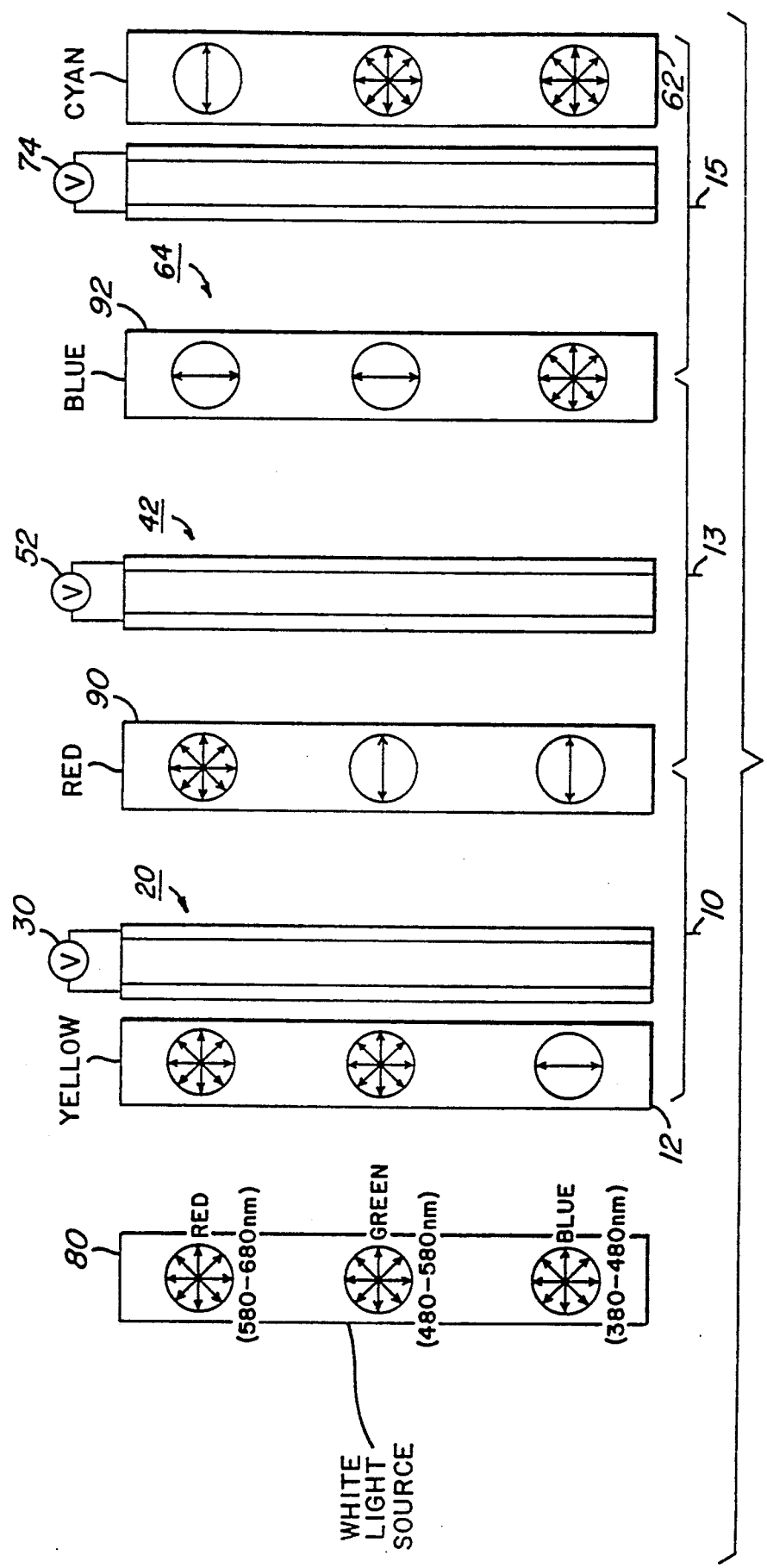
FIG. 10 shows how the adjacent selective dichroic polarizers of the subtractive LCD filters arranged in accordance with FIG. 1 can be combined to reduce the number of intermediate polarizers.

FIG. 10 shows the arrangement of a full color liquid display in accordance with this invention, in which the filters are arranged yellow, magenta, cyan, and the intermediate polarizers are combined. The liquid crystal display panels 20, 42, 64, together with their associated voltage sources 30, 52, 74, are in the form as has been discussed in connection with FIG. 1. The yellow input polarizer 12 is the same as has been described in connection with FIG. 1, as is the cyan output polarizer 62. The intermediate polarizer pairs 32, 36, and 38, 60 as shown in FIG. 1 are replaced in this embodiment by red polarizer 90 and blue polarizer 92 respectively. Thus in the FIG. 10 arrangement, the red polarizer is part of both the blue filter 10 and the green filter 13. Similarly, the blue polarizer 92 is part of the green filter 13 and the red filter 15.

Figure 11:
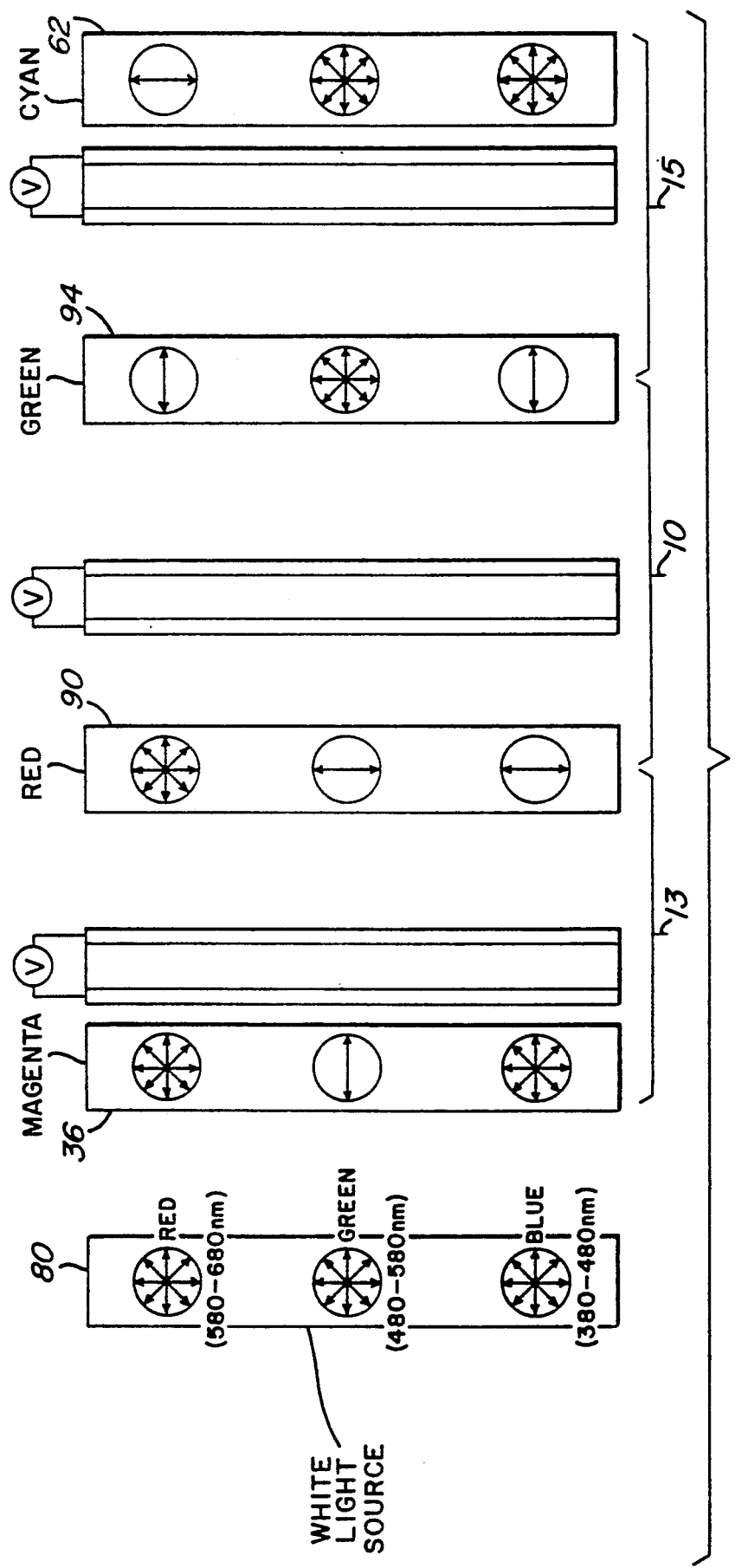
FIG. 11 shows how the intermediate polarizers can be combined in a liquid crystal display in accordance with this invention, in which the filters are arranged in the order magenta, yellow, cyan.

A full liquid crystal display is shown in FIG. 11, in which the filters are arranged as magenta-yellow-cyan, as in FIG. 8, and the adjacent intermediate polarizers are combined. The adjacent cyan and yellow polarizers 38, 12 are combined, and replaced by red polarizer 90, while adjacent yellow and cyan polarizers 32 and 60 are replaced by green polarizer 94.

Figure 12:
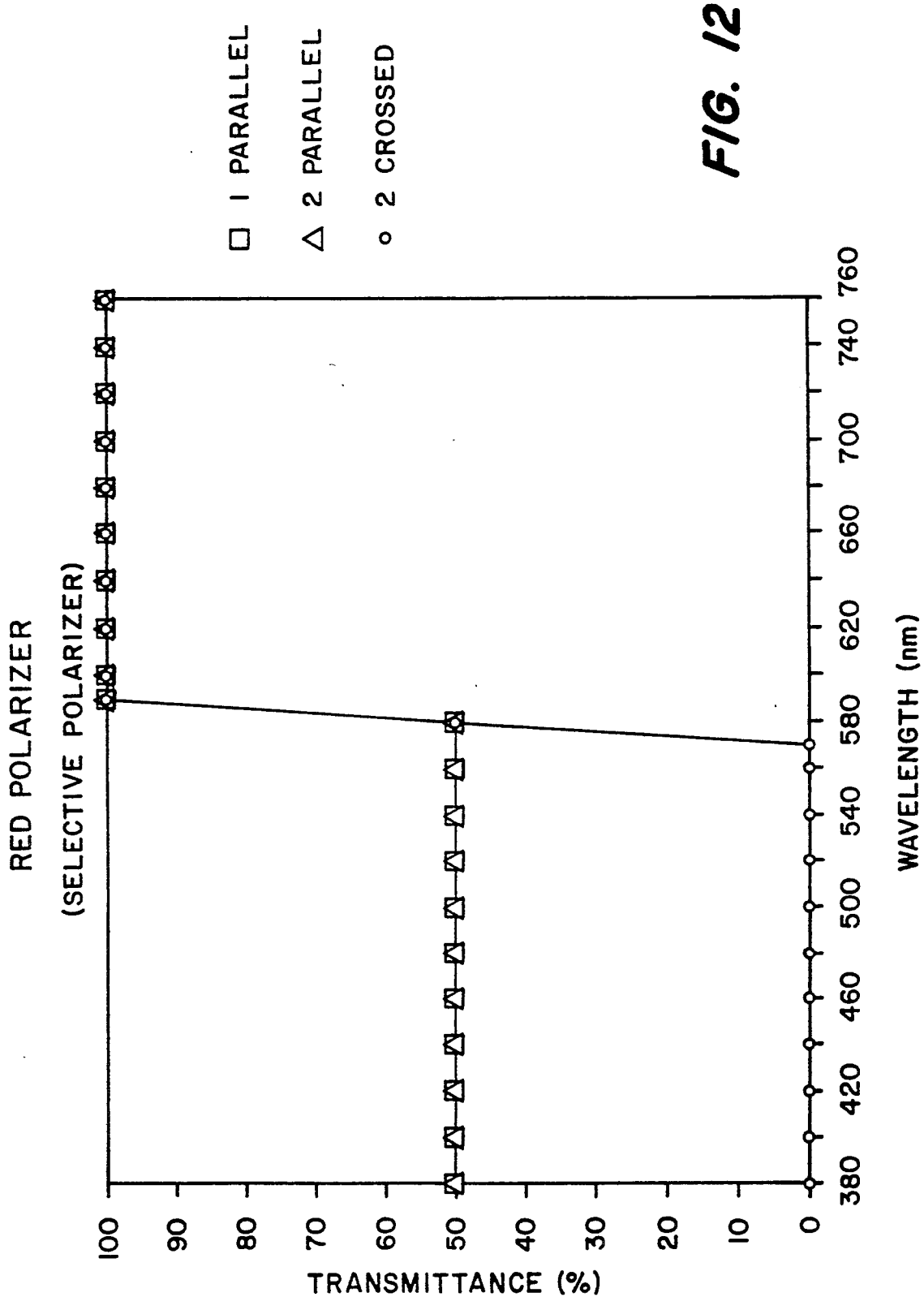
FIG. 12 is a graph of the relative transmittance of a red selective dichroic polarizer as used in accordance with this invention.
Figure 13:
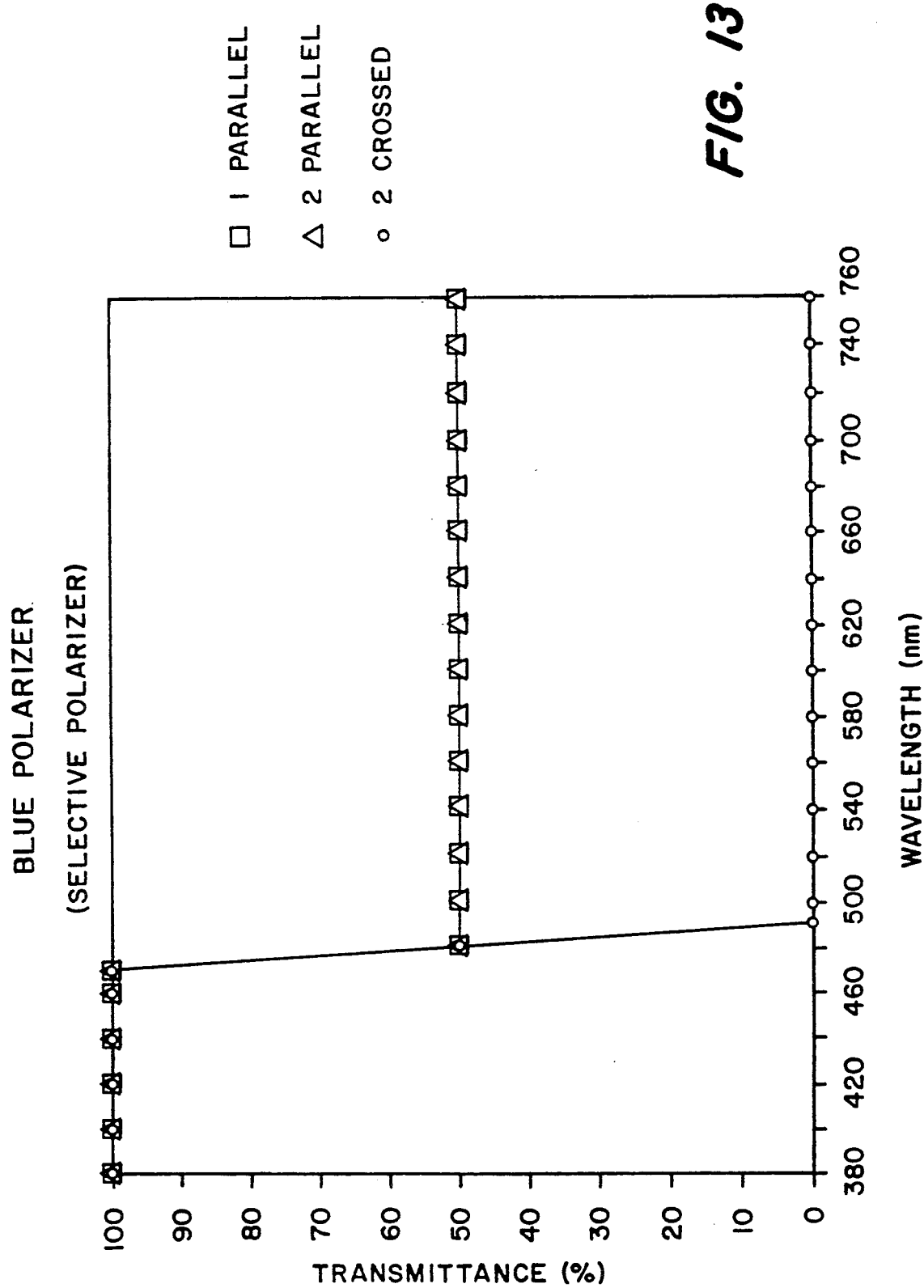
FIG. 13 is a graph of the relative transmittance of a blue selective dichroic polarizer as used in accordance with this invention.

The characteristics of the red and blue polarizers 90, 92, as shown in FIG. 10, are illustrated graphically at FIGS. 12 and 13. As shown in FIG. 12, red polarizer 90 passes at substantially 100% transmittance wavelengths above about 35 about 590 nm. Wavelengths below 590 nm are attenuated about 50% when oriented parallel to the orientation of the polarizer, and nearly 100% when oriented perpendicular to the orientation of the polarizer.

As shown in FIG. 13, blue polarizer 92 passes substantially unaffected wavelengths below about 470 nm. Wavelengths above 470 nm are attenuated about 50% when the light polarization is parallel to the orientation of the polarizer, and are attenuated about 100% when the polarization is perpendicular to the polarization of the polarizer.

Figure 14:
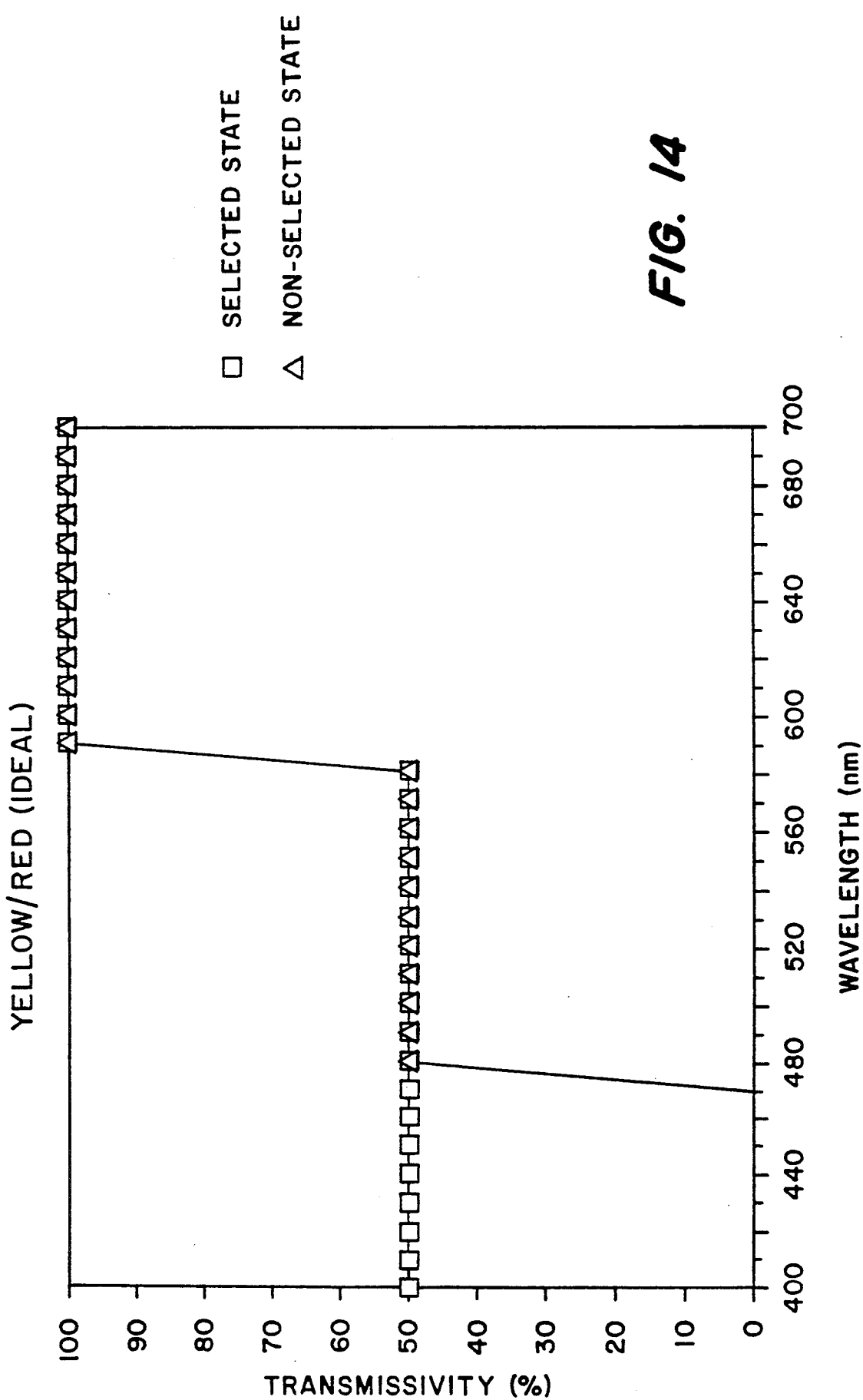
FIG. 14 is a graph of the relative transmissivity of the combination of the first two polarizers and the first LCD panel, as shown in FIG. 10.
Figure 15:
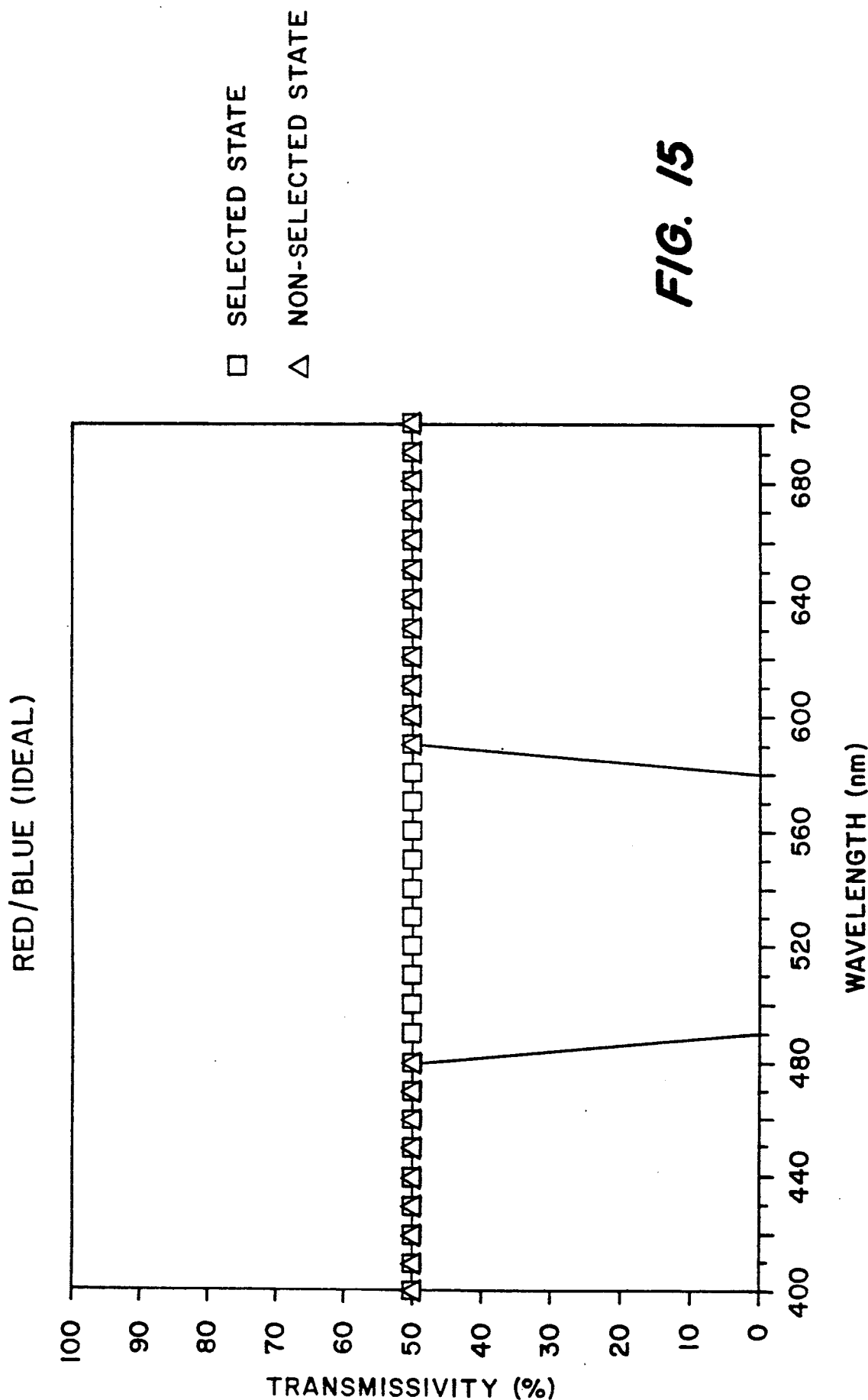
FIG. 15 is a graph of the transmissivity of the intermediate LCD panel and two adjacent polarizers, as shown in FIG. 10.
Figure 16:
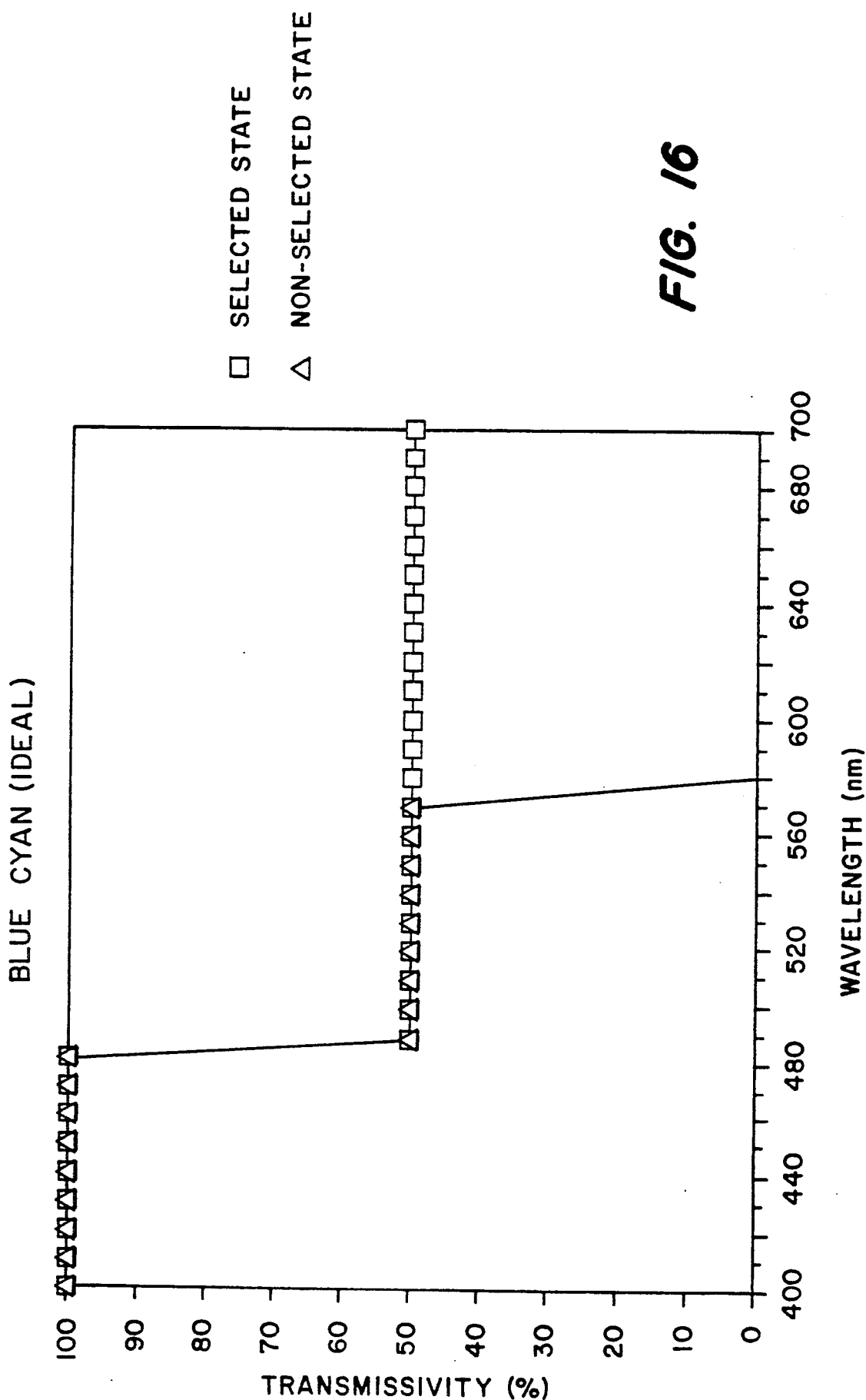
FIG. 16 is a graph of the transmissivity of the last LCD panel and its adjacent polarizers, as shown in FIG. 10.

The characteristics of each of the liquid crystal display panels 20, 42, 64, together with the two adjacent polarizers, are shown in FIGS. 14, 15 and 16. While each of these graphs is accurate on its own, they cannot be conceptually combined as were the characteristics of the filters shown in FIGS. 5, 6, and 7, since, for example, red polarizer 90 is considered twice, that is in the characteristics shown in each of FIGS. 14 and 15, as is blue polarizer 92. Nevertheless, the graphs are useful in understanding how the filters affect light of different colors. Referring first to FIG. 14, in the selected state, wavelengths above 590 nm are passed at 100% relative transmissivity; and wavelengths below 580 nm are passed at substantially 50% attenuation. Wavelengths below 480 nm are attenuated substantially 100% in the non-selected state, but are not further attenuated (from the 50% level) in the selected state.

As shown in FIG. 15, a combination of the red and blue polarizers with liquid crystal display panel 42 produces an overall attenuation of 50% for all wavelengths in the selected state. In the non-selected state, the wavelengths between 480 and 590 nm are attenuated substantially 100% with the other wavelengths substantially unaffected by the change, that is attenuated about 50%.

Finally, the combination of blue filter 92, liquid crystal display panel 64, and cyan polarizer 62 is shown in FIG. 16. Below about 470 nm, all wavelengths are passed at about 100% transmissivity, without regard to selection state. Between 480 and 580 nm, light is passed at about 50% transmissivity, without regard to selection. Above 580 nm, light is attenuated substantially 100% in the non-selected state, but is passed at 50% attenuation in the selected state.

Figure 17:
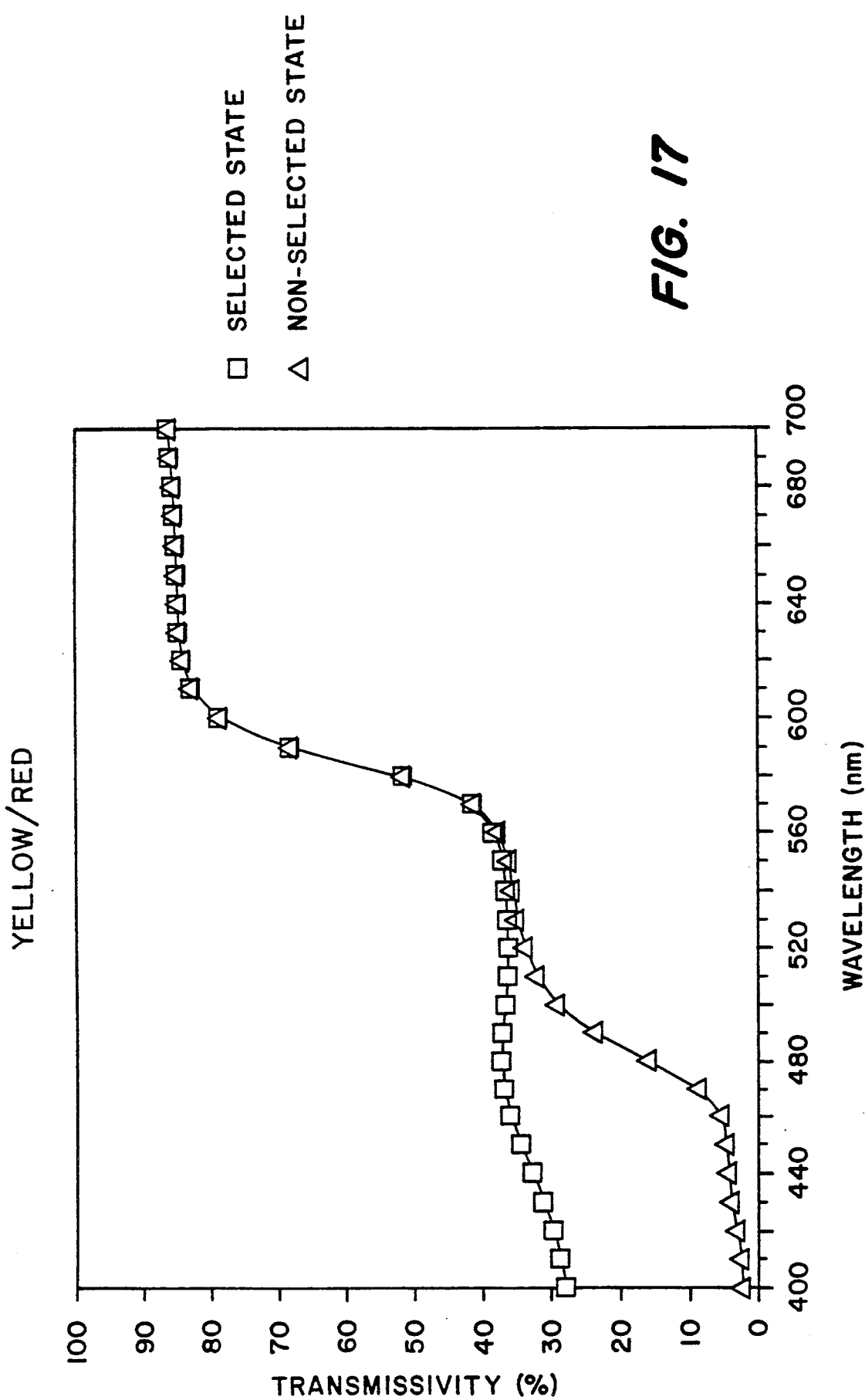
FIG. 17 is a graph of the transmissivity of an LCD filter as in FIG. 14, as realized using actual components.
Figure 18:
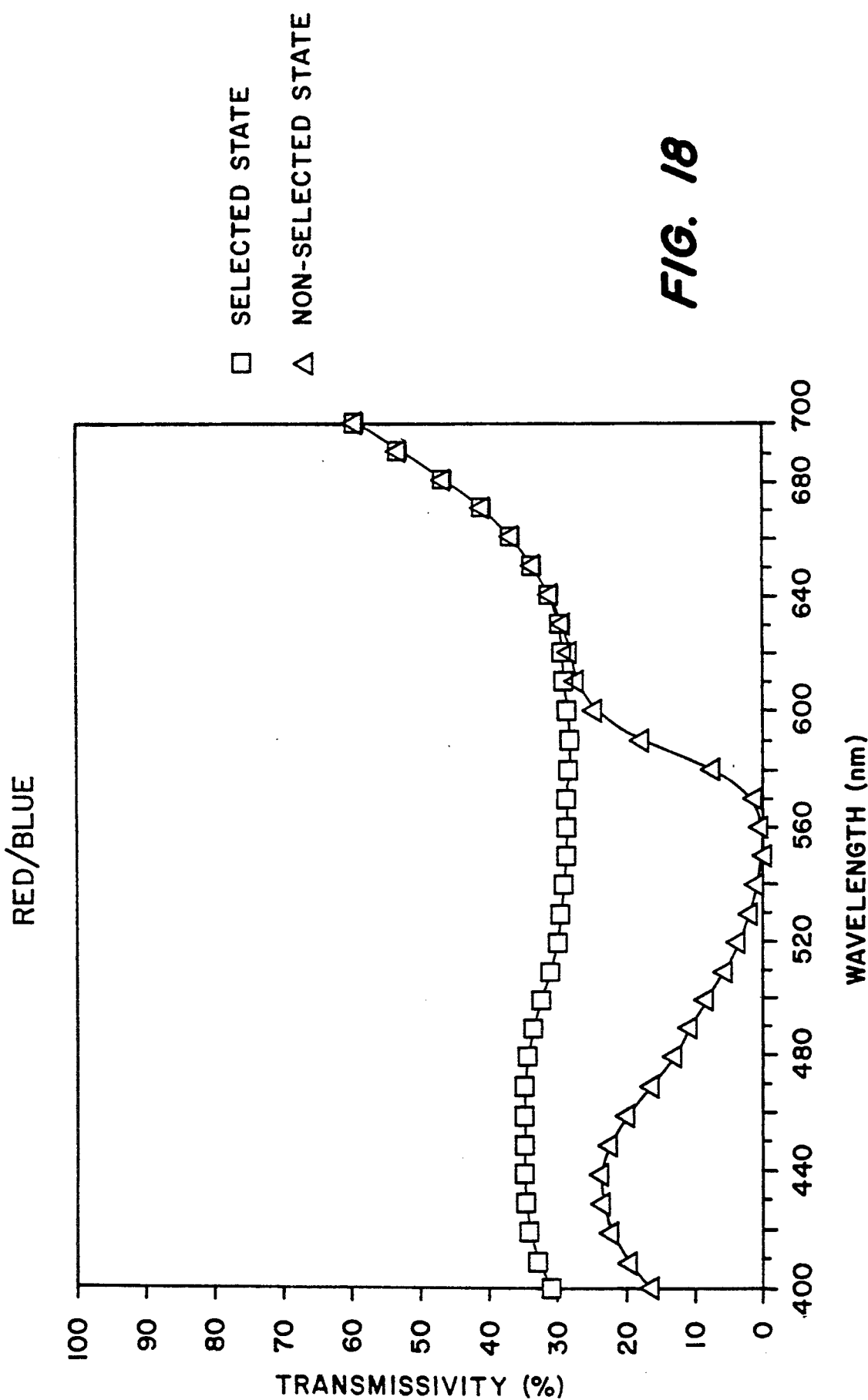
FIG. 18 is a graph of the transmissivity of an LCD filter as in FIG. 15, as realized using actual components.

Transmittance characteristics with respect to wavelength for the three filters shown in FIGS. 14, 15 and 16, as implemented with real components, are shown graphically in FIGS. 17, 18 and 19. Because actual values reasonably close to the theoretical values shown in the preceding figures can be obtained with real components, this particular arrangement of filters is presently preferred. However, should better selective dichroic polarizers for particular colors become available, the flexibility of the present invention allows the filters to be simply reordered, to take advantage of the best currently available polarizers to provide the best possible performance.

By appropriately selecting or deselecting individual ones of the liquid crystal display panels 20, 42, 64, a full range of colors may be produced. The following table shows the color transmitted by a full color liquid crystal display in accordance with this invention, for each of the eight possible combinations of the three fully selected or non-selected liquid crystal display panels.

| Blue Filter | Green Filter | Red Filter | Color Out |
| --- | --- | --- | --- |
| 0 | 0 | 0 | White |
| 0 | 0 | 1 | Cyan |
| 0 | 1 | 0 | Magenta |
| 0 | 1 | 1 | Blue |
| 1 | 0 | 0 | Yellow |
| 1 | 0 | 1 | Green |
| 1 | 1 | 0 | Red |
| 1 | 1 | 1 | Black |

0 = Non-selected State
1 = Selected State

It will be noted that a full range of colors including black and white can be readily produced by appropriately selecting the liquid crystal displaying panels. Further, there is a simple and direct mapping between the states of the LCD panels and the output colors, such that, for example, blue output is produced by subtracting (that is to say selecting) green and red, while passing (that is to say not subtracting) blue. Cyan, which is the additive combination of blue and green, is created by subtracting red only and passing blue an green.

It will be understood that while the invention has been described thus far in connection with a generalized combination of filters without mention of the size thereof, in the more common applications of the present invention, each of the liquid crystal display panels will include a matrix of independently selectable pixels, for creating a full color display.

While the invention has been shown and described in connection with a presently preferred embodiment thereof, those skilled in the art will recognize that many modifications and changes may be made therein, without departing from the true spirit and scope of the invention, which accordingly is intended to be defined solely by the appended claims.

What is claimed is:

1. A full color liquid crystal display, comprising:
   first, second, and third subtractive LCD filters, each filter comprising means for independently subtracting one of the primary colors (red, green, blue) from a polychromatic light beam without substantially affecting the other primary colors, each filter including:
   an entrance selective dichroic polarizer for polarizing light of one of the primary colors while passing light of the other colors substantially unpolarized;
   an LCD panel for selectively rotating incident light through a known twist angle;
   an exit selective dichroic polarizer for selectively blocking or passing the light of the same one of the primary colors, depending upon the rotation imparted by the LCD panel, and passing light of the other colors.

2. The light crystal display of claim 1 in which the first subtractive LCD filter comprises a yellow filter for subtracting blue light;
   the second subtractive LCD filter comprises a magenta filter for subtractive LCD for subtracting green light; and
   the third subtractive LCD filter comprises a cyan filter for subtracting red light.

3. The liquid crystal display of claim 1 in which the first, second and third subtractive LCD filters are arranged sequentially and in which sequentially adjacent entrance and exit polarizers of the first and second filters, respectively, and of the second and third filters, respectively, each comprise a single polarizer.

4. The liquid crystal display of claim 2 in which the first, second and third subtractive LCD filters are arranged sequentially and in which sequentially adjacent entrance and exit polarizers of the first-second and second-third filters each comprise a single polarizer.

5. The liquid crystal display of claim 4 in which the first-second polarizer comprises a red polarizer for polarizing green and blue light; and
   the second-third polarizer comprises a blue polarizer for polarizing red and green light.

6. The liquid crystal display of any of claims 1-5 in which each LCD panel comprises a plurality of individually selectable regions.

7. Display apparatus comprising:
   first, second, and third twisted nematic liquid crystal display panels for imparting an effective twist to applied incident spectral radiant energy between 0° and about 90°+n (180°) where n=0, 1, 2, ... as an exitation voltage is applied to the liquid crystal display panel;
   first, second, third, fourth, fifth, and sixth polarizers;

the first liquid crystal display panel being disposed between the first and second polarizers, the second liquid crystal display panel being disposed between the third and fourth polarizers, and the third liquid crystal display panel being disposed between the fifth and sixth polarizers;

the first and second polarizers characterized by selectively linearly polarizing the spectral radiant energy of a first primary color, while transmitting the spectral energy of second and third primary colors unaffected;

the third and fourth polarizers selected to linearly polarize spectral radiant energy of the second primary color, while transmitting spectral radiant energy of the first and third primary colors unaffected;

the characteristics of the fifth and sixth polarizer selected to linearly polarize spectral radiant energy of the third primary color, while transmitting the spectral energy of the first and second primary colors unaffected;

the first, second, and third panels in cooperation with the selective polarizers adjacent thereto being operative, in combination, to block one of the primary colors, while transmitting the balance of incident spectral radiant energy unaffected when the panel is in a first state and for transmitting incident spectral radiant energy of all colors when the panel is in a second state.

8. The display apparatus of claim 7 in which each of said panels comprises an array of electronically controlled pixels, corresponding ones of said pixels in each of said panels being aligned along an axis or orthoganal to the panels.

9. The display apparatus of claim 7 in which the combination of the first panel and the first and second selective polarizers adjacent thereto are operative to linearly polarize spectral energy of a first primary color when the panel is in a second state, while transmitting the spectral energy for the second and third primary colors unpolarized.

10. The display apparatus of claim 7 in which the combination of the second panel and the third and fourth selective polarizers adjacent thereto are operative to linearly polarize the spectral energy of a second primary color when the panel is in a second state, while transmitting the spectral energy for the first and third primary colors unpolarized.

11. The display apparatus of claim 7 in which the combination of the third panel and the fifth and sixth selective polarizers adjacent thereto are operative to linearly polarize the spectral energy of a third primary color when the panel is in a second state, while transmitting the spectral energy for the first and second primary colors unpolarized.

12. Display apparatus comprising:

first, second, and third twisted nematic liquid crystal display panels for imparting an effective twist to applied incident spectral radiant energy of between 0° and about 90°+n (180°) where n=0, 1, 2, ... as an exitation voltage is applied to the liquid crystal display panels;

first, second, third, and fourth polarizers;

the first panel disposed between the first and second polarizers, the second panel disposed between the second and third polarizers, and the third panel disposed between the third and fourth polarizers;

the first polarizer being adapted to selectively linearly polarize spectral radiant energy corresponding to a first primary color, while transmitting spectral radiant energy of other colors substantially unaffected;

the second polarizer operative to selectively linearly polarize spectral radiant energy of both the first and second primary colors, while transmitting spectral radiant energy of the third primary color substantially unpolarized;

the third polarizer being selected to selectively linearly polarize spectral radiant energy of both the second and third primary colors, while transmitting spectal radiant energy of the first primary color substantially unpolarized;

each of the fourth polarizer being selected to selectively linearly polarize the third primary color while transmitting the first and second primary colors unpolarized;

the first, second, and third panels in cooperation with the selective polarizers adjacent thereto being operative, in combination, to block one of the primary colors while transmitting the balance of incident spectral radiant energy unaffected in a first state, and to pass incident spectral radiant energy of all colors in a second state.

13. The display apparatus of claim 12 in which each of said panels comprises an array of electronically controlled pixels, corresponding ones of said pixels in each of said panels being aligned along an axis or orthogonal to the panels.

14. The display apparatus of claim 12 in which the first liquid crystal display panel, in the second state, in combination with the first and second selective polarizers adjacent thereto, linearly polarizes the spectral energy of the first and second primary colors, while transmitting the spectral energy of the third primary color unpolarized.

15. The display apparatus of claim 12 in which the second panel when in its second state is operative, in combination with the second and third selective polarizers adjacent thereto, to linearly polarize spectral energy of the first, second, and third primary colors.

16. The display apparatus of claim 17 in which the third panel, when in a second state, is operative, in combination with the third and fourth selective polarizers adjacent thereto, to linearly polarize the spectral energy of the second and third primary colors, while transmitting the spectral energy of the first primary color unpolarized.

* * * * *